Patented Feb. 8, 1949

2,461,437

UNITED STATES PATENT OFFICE 2,461,437

MANUFACTURE OF NITRILES

Peter Oxley, Thomas David Robson, Adolf Koebner, and Wallace Frank Short, Nottingham, England, assignors to Boots Pure Drug Company Limited, Nottingham, England, a company of Great Britain No Drawing. Application October 22, 1945, Serial No. 623,880. In Great Britain November 6, 1944

4 Claims. (Cl. 260—465)

This invention relates to the manufacture of the corresponding nitriles from substituted benzoic acids of the general formula

R.SO₂.C₆H₄.COOH where R is a lower alkyl group.

The invention is concerned particularly, but not exclusively, with the manufacture of substituted benzonitriles in which the substituent consists of a sulphone group, R.SO₂—, where R is a lower alkyl group, the nitriles of the general formula R.SO₂.C₆H₄.CN being of value as intermediates in the preparation of valuable therapeutic substances.

It has now been found that, if a substituted benzoic acid is heated with certain sulphonamides, the nitriles corresponding to the acids used can be obtained in very good yield with great ease.

According to the invention, a substituted benzoic acid of the formula set forth above, is heated with a sulphonamide, for example, benzenesulphonamide, at a temperature in the neighbourhood of 225° C., when a reaction (of an exothermic nature) takes place and the reaction product is worked up when the yield of nitrile is a maximum or before it has substantially decreased. A good yield is obtained of the nitrile corresponding to the acid used.

The point at which the reaction should be stopped can be easily ascertained by making periodical tests, and when the optimum time of reaction for any particular starting materials has once been determined the tests need not of course be repeated.

The proportion of acid to sulphonamide may vary to some extent but it has been found that optimum results are usually obtained with a proportion of 1 mol. of acid to 2 mols. of sulphonamide.

As the sulphonamide used, benzene sulphonamide has been found to give satisfactory results, but other sulphonamides such as p-toluene sulphonamide may also be used.

In order that the nature of the invention may be easily understood, the following example of the application of the process of the invention is given:

Example

In the preparation of p-cyanophenyl methyl sulphone, a mixture of p-carboxyphenyl methyl sulphone (20 g. 1 mol.) and benzenesulphonamide (31.4 g. 2 mols.) is heated at 225° C. during 1¼ hours. (At a temperature of 210° C. the time of heating is prolonged to 2½ hours.) After cooling the reaction product, it is washed successively with dilute sodium hydroxide solution, dilute hydrochloric acid solution and finally with water and it is then crystallised from aqueous alcohol. The product melts 140° C.

By similar methods there may be obtained p-cyano phenyl ethyl sulphone from p-carboxyphenyl ethyl sulfone (M. P. 96° C., found, N 7.2%, C₉H₉O₂NS requires N, 7.2%) and p-cyanophenyl propyl sulphone (M. P. 83°–84° C., found N, 6.8%, C₁₀H₁₁O₂NS requires N, 6.7%).

We claim:

1. A process for the production of nitriles of the general formula R.SO₂.C₆H₄.CN from substituted benzoic acids of the general formula R.SO₂.C₆H₄.COOH, where R is a lower alkyl group, which comprises the step of heating the acid with a sulphonamide at atmospheric pressure and to a temperature from about 220° C. to about 240° C. for a period not exceeding about two hours.

2. A process as claimed in claim 1, in which the reacting substances are present in the proportion of one molecule equivalent of the substituted benzoic acid to two molecules of the sulphonamide.

3. A process as claimed in claim 1, in which the sulphonamide is benzene-sulphonamide.

4. A process as claimed in claim 1 in which the sulphonamide is toluene-p-sulphonamide.

PETER OXLEY.
THOMAS DAVID ROBSON.
ADOLF KOEBNER.
WALLACE FRANK SHORT.

REFERENCES CITED

The following references are of record in the file of this patent:

Rouiller, American Chemical Journal, vol. 47, pages 475–97 (1912).